No. 728,318. PATENTED MAY 19, 1903.
F. O. SODERSTROM.
COVER FOR RECEPTACLES.
APPLICATION FILED DEC. 2, 1901.
NO MODEL. 2 SHEETS—SHEET 1.
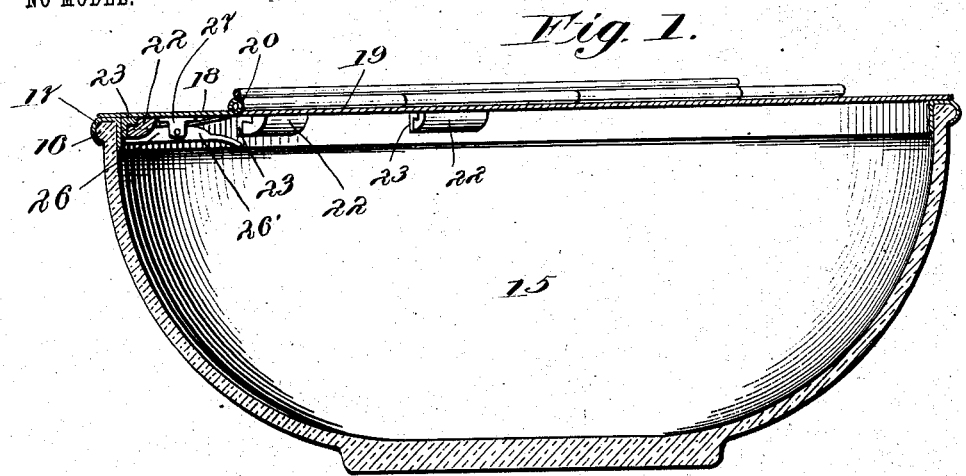
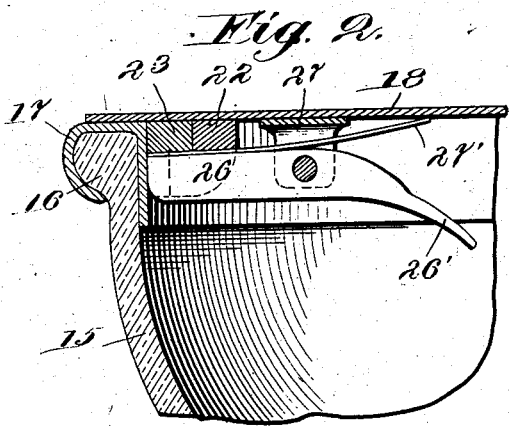
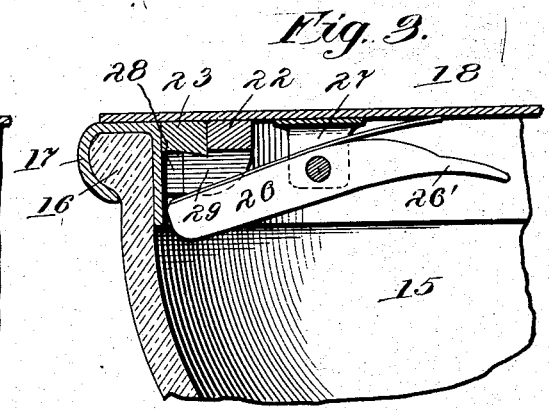
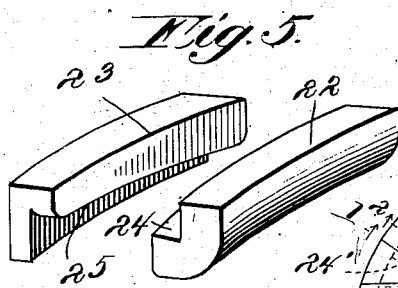
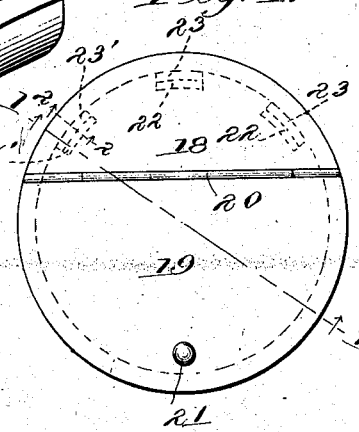
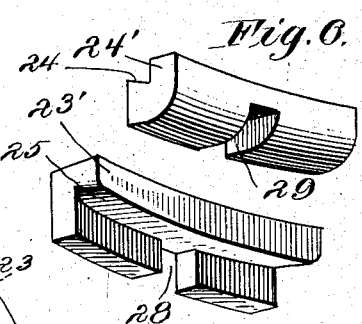
Witnesses:
H. L. Gaither
Helen L. Peck
Inventor:
Frank O. Soderstrom
by Wm. O. Belt
Attorney.

No. 728,318. PATENTED MAY 19, 1903.
F. O. SODERSTROM.
COVER FOR RECEPTACLES.
APPLICATION FILED DEC. 2, 1901.
NO MODEL. 2 SHEETS—SHEET 2.
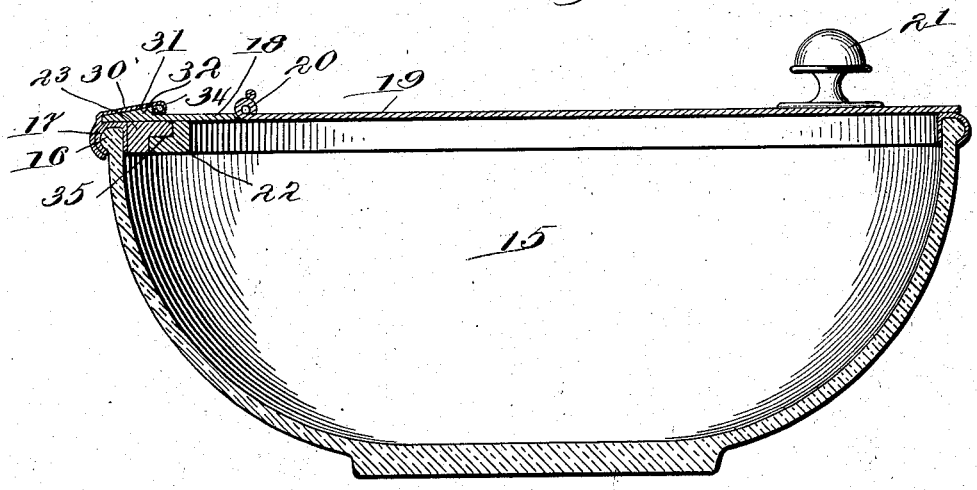
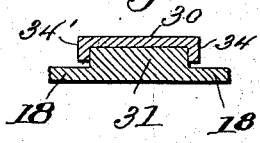 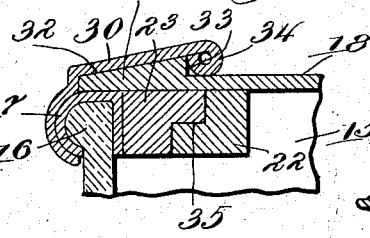
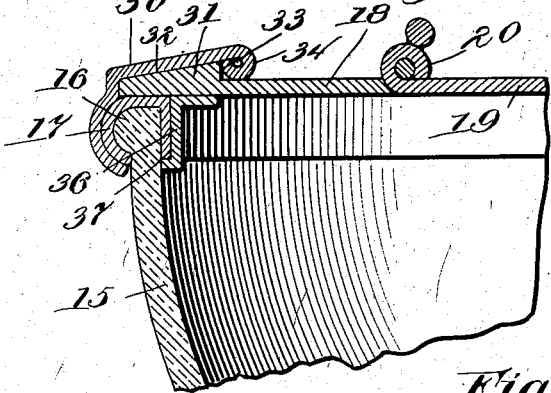 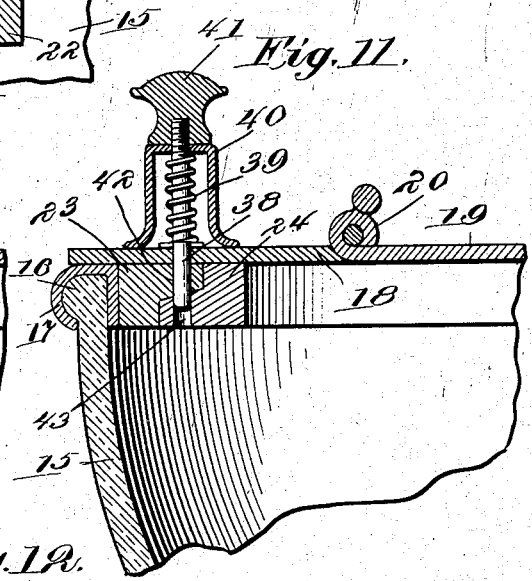
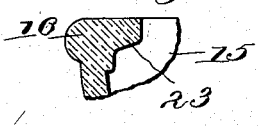
Witnesses:
H. L. Gaither
Helen L. Peck
Inventor:
Frank O. Soderstrom
by Wm. C. Bel—
Attorney.

No. 728,318.
Patented May 19, 1903.

UNITED STATES PATENT OFFICE.

FRANK O. SODERSTROM, OF CHICAGO, ILLINOIS.

COVER FOR RECEPTACLES.

SPECIFICATION forming part of Letters Patent No. 728,318, dated May 19, 1903.

Application filed December 2, 1901. Serial No. 84,389. (No model.)

*To all whom it may concern:*

Be it known that I, FRANK O. SODERSTROM, a citizen of the United States, residing at Chicago, in the county of Cook and State of Illinois, have invented certain new and useful Improvements in Covers for Receptacles, of which the following is a specification.

This invention relates to novel improvements in covers for receptacles, and it will be found particularly useful in connection with glass bowls provided with metal covers like those largely used at soda-water fountains for containing crushed fruits. Heretofore such bowls have been provided with covers which are not removable, and considerable difficulty has been experienced in washing and cleaning them, especially to attain the high degree of cleanliness desired for bowls used for this purpose. The same is likewise true of pitchers and other receptacles, and the invention is correspondingly useful in connection therewith.

It is my object, therefore, to provide a cover for receptacles which can be easily and quickly removed from the receptacle for cleansing and other purposes and as readily secured in place again on the receptacle for use in the ordinary manner.

For the purpose of illustrating my invention I have shown in the accompanying drawings several different ways of embodying the invention with a bowl, and referring thereto—

Figure 1 is a sectional view on the line 1 1 of Fig. 4. Fig. 2 is a detailed enlarged sectional view on the line 2 2 of Fig. 4. Fig. 3 is a similar view showing the locking-lever in open position. Fig. 4 is a top plan view of a bowl embodying the invention. Fig. 5 is a perspective view showing a pair of locking-lugs. Fig. 6 shows the locking-lugs which are slotted to receive the locking-lever. Fig. 7 is a front view showing the locking-lever engaging the two lugs. Fig. 8 is a sectional view of a bowl, showing my invention embodied in a different form. Fig. 9 is an enlarged sectional view of the locking device shown in Fig. 8. Figs. 10 and 11 illustrate other forms in which the invention may be embodied. Fig. 12 shows lugs integral with the receptacle.

In the drawings I have illustrated a glass bowl provided with a metal cover of the general style heretofore referred to as used for containing crushed fruits; but I do not limit myself to a bowl of this kind or to a glass bowl or metal cover, as it will be apparent to those skilled in the art that the invention can be embodied with other bowls or with pitchers, barrels, and other receptacles with equally satisfactory results.

The bowl 15 shown in the drawings is provided with a bead 16, having a metal rim 17 secured thereon. The cover 18 comprises a lid 19, hinged at 20, which can be raised and lowered by means of a knob 21. This cover is made of metal and rests upon the top of the rim, and when the lid is down the bowl is completely closed to exclude all foreign matter.

The cover is provided with parts arranged to engage fixed parts on the bowl, and this engagement may be effected in such way as to produce an interlocking of the parts sufficient for some purposes; but, generally speaking, I prefer to employ a positive locking device for holding the parts interlocked. In Figs. 1 and 2 and elsewhere I have shown lugs 22 on the fixed part of the cover to engage with lugs 23 on the bowl, and these lugs may have straight engaging faces, as indicated by 35 in Figs. 8 and 9, or they may be provided with interlocking engaging faces, as shown in the figures on Sheet 1 of the drawings, in which the engaging faces of the lugs are inclined longitudinally and beveled relative to each other, so that they will be locked together when engaged in the proper manner. This interlocking engagement of the lugs affords a tight joint and fastens the cover on the bowl against a forward movement of the cover, which will be a sufficient fastening for some purposes. The lugs 23 are shown to be rigid with the rim 17 on the bowl, but, as shown in Fig. 10, it is apparent that lugs 36 may be provided on the cover for engaging with the edge 37 of the rim, or, as shown in Fig. 12, the lugs 22 on the cover may engage lugs 23, formed integral with the bowl. The lugs are preferably made of angular form, as shown in Figs. 5 and 6, but the exact shape thereof may be changed.

To effect engagement of the lugs when provided with straight faces 35, the cover is simply placed upon the bowl with the lugs on the cover in approximate alinement with those on the bowl, and the cover is then pushed back until the lugs are properly engaged and the cover is in its correct position on the bowl; but to effect engagement of the interlocking lugs, as shown in Figs. 5 and 6, the cover is placed on the bowl with the lugs on the cover in peripheral alinement with the lugs on the bowl, and then the cover is turned bodily on the bowl until the lugs are properly engaged and interlocked.

I prefer to employ also a positive locking device for holding the lugs interengaged, and this locking device may be of any suitable form. In Figs. 1, 2, and 3 I have shown a lever 26, pivoted in bearings 27 on the under side of the cover, with its forward end under tension of a spring 27' and arranged to enter slots 28 and 29 in one pair of the lugs (marked 23' and 24' in Fig. 6) when these lugs are properly engaged with each other and the slots alined. The handle 26' of this lever projects forward in convenient position to be operated when the lid of the cover is raised, so that the locking and unlocking operation can be conveniently accomplished. This lever will effectually lock the cover in its proper position on the bowl by reason of its engagement with the slots of two interengaged lugs, and it not only prevents the cover from turning on the bowl, but also acts in conjunction with the beveled engaging faces of the lugs to prevent any forward movement of the cover on the bowl. This result is accomplished because the lever is supported radially on the cover, and the slots in the lugs are cut on radial lines, so that the sides of the lever will engage the walls of the lugs to prevent either a side or forward movement of the cover.

While the lever heretofore described is a desirable means for locking the cover on the bowl after the lugs have been properly interlocked, it is apparent that it may also be used with the straight-faced lugs shown in Figs. 8 and 9 and that other means may be employed to accomplish the same result. For example, a spring-catch 30, Figs. 8 and 9, may be fastened to the rim and constructed and arranged to engage a projection 31 at the back of the cover. This projection has an inclined top face 32 and a straight front 33, and the free end of the spring-plate is bent substantially in the form of a hook 34 and constructed to slide easily over the inclined face of the projection and engage the front while the flanges 34' engage the sides thereof in the manner illustrated in the drawings. When this plate is thus engaged with the projection, it will effectually prevent the cover from moving forward or sidewise on the bowl, and thus hold the lugs in constant and positive interlocked engagement. With a locking device of this construction the engaging faces of the lugs would preferably be straight, as indicated by 35, and not inclined or beveled, as heretofore described. The cover is placed upon the bowl and pushed back beneath the spring-plate until the lugs are interlocked and the end and flanges of the spring-plate have engaged the front and sides of the projection.

In Fig. 11 I have shown a locking device consisting of a bolt 38, which is controlled by a spring 39, inclosed within a housing 40, the upper end of the bolt being provided with a knob or handle 41 and the lower end of the bolt passing through the cover and entering apertures 42 and 43 in the overlapped parts of the lugs 23 24. This cover is arranged on the bowl in a manner similar to the cover shown in Figs. 8 and 9, the spring-bolt being withdrawn by lifting the knob or handle 41 until the lugs have been interlocked and the apertures 42 and 43 brought into register to receive the bolt, which it is apparent will effectually lock the cover on the bowl.

The invention may be embodied in other forms; but it is not considered necessary to enter into a detailed description thereof.

The invention provides an improved cover for receptacles possessing many advantages over those of the prior art, as it permits the cover to be instantly removed from the receptacle, so that access can be had to all parts thereof for cleaning and other purposes. For this reason it is particularly useful in connection with the fruit-bowls heretofore described and with pitchers and other receptacles of many different kinds.

The construction of the invention is very simple and requires no particular skill or experience for its manipulation, and it can be made inexpensively and does not in any way detract from the appearance of the bowl.

Having thus fully described my invention, what I claim, and desire to secure by Letters Patent, is—

1. The combination with a receptacle, of a removable cover therefor comprising a hinged lid and a fixed part, interengaging parts on the receptacle and fixed part of the cover, said interengaging parts being located at the back of the fixed part and within the receptacle, and means for locking the fixed part of the cover to the receptacle when said interengaging parts are engaged to hold the cover in proper position on the receptacle.

2. The combination with a receptacle, of a removable cover therefor, comprising a hinged lid and a fixed part, interengaging parts on the receptacle and fixed part of the cover provided with locking-faces to prevent a forward movement of the cover, and locking means to hold said parts in engagment.

3. The combination with a receptacle, of a removable cover therefor comprising a hinged lid and a fixed part, lugs on the receptacle, lugs carried by the fixed part of the cover and arranged to engage the lugs on the receptacle, and means for locking the hinged part on the receptacle with the lugs in positive engagement.

4. The combination with a receptacle, of a removable cover therefor comprising a hinged lid and a fixed part, and lugs on the fixed part of the cover and on the receptacle provided with inclined and beveled interengaging locking-faces.

5. The combination with a receptacle, of a removable cover therefor comprising a hinged lid and a fixed part, angular lugs on the fixed part of the cover and on the receptacle provided with interengaging locking-faces, and means for locking the cover to the receptacle with the lugs in interlocked engagement.

6. The combination with a receptacle, of a removable cover therefor comprising a hinged lid and a fixed part, lugs on the fixed part of the cover and on the receptacle provided with inclined and beveled interengaging locking-faces, and means for locking the cover to the receptacle with the lugs in interlocked engagement.

7. The combination with a receptacle, of a removable cover therefor comprising a hinged lid and a fixed part, interengaging devices on the fixed part of the cover and on the receptacle, and a lever for enagaging and locking said devices in engagement with each other.

8. The combination with a receptacle, of a removable cover therefor, lugs on the cover and receptacle, one pair of said lugs being provided with alined slots, and a lever carried by the cover to enter said slots and lock the cover to the receptacle with the lugs in engagement.

9. The combination of a receptacle, a rim fastened on the edge thereof, a cover resting upon the rim and comprising a hinged lid and a fixed part, means arranged within the receptacle to effect engagement between the fixed part of the cover and the rim to prevent outward movement of the cover, and locking means for said engaging means.

10. The combination of a receptacle, a rim secured on the edge of the receptacle and provided with lugs, a flat removable cover arranged to rest on the rim and comprising a hinged lid and a fixed part, lugs on the fixed part of the cover to engage the lugs on the rim, and means for locking the cover to the receptacle with the lugs in engagement.

FRANK O. SODERSTROM.

Witnesses:
WM. O. BELT,
HELEN L. PECK.